United States Patent
Clauset, Jr. et al.

[15] 3,684,872
[45] Aug. 15, 1972

[54] MEANS AND METHOD FOR AUTOMATICALLY DETERMINING THE INTERFACE POSITIONS OF AN INJECTION FLUID IN A PETROLEUM OR GAS RESERVOIR USING AN ELECTROLYTIC MODEL OF THE RESERVOIR

[72] Inventors: Alvin O. Clauset, Jr.; Donald L. Hoyt; Russell W. Hall, Jr., all of Houston, Tex.

[73] Assignee: Texaco Inc., New York, N.Y.

[22] Filed: Oct. 30, 1970

[21] Appl. No.: 85,503

[52] U.S. Cl............235/151.3, 235/61.6 B, 235/184, 346/33 W
[51] Int. Cl.............................................G06g 7/48
[58] Field of Search......235/151.3, 184, 193, 61.6 A, 235/61.6 B, 61.6 R; 324/1, 13; 346/33 WL

[56] References Cited

UNITED STATES PATENTS

| | | | |
|---|---|---|---|
| 2,569,817 | 10/1951 | Wolf et al | 235/61.6 B |
| 2,858,978 | 11/1958 | Yetter | 235/61.6 B |
| 2,824,869 | 2/1958 | Aronofsky | 235/61.6 B |
| 2,838,233 | 6/1958 | Garrison | 235/61.6 B |
| 2,913,170 | 11/1959 | Piety | 235/61.6 B |
| 3,038,656 | 6/1962 | Horwitz et al | 235/61.6 B |

Primary Examiner—Joseph F. Ruggiero
Attorney—Thomas H. Whaley and Carl G. Reis

[57] ABSTRACT

An insulated grid, having four electrode probes at each intersection, overlays an analog model, using an electrolytic solution, of a petroleum or gas reservoir so that some or all of the probes are immersed in the electrolytic solution. Electrodes representing an injection well and a withdrawal well in the reservoir introduce an alternating current in the electrolytic solution corresponding to the injection rate of a fluid in the injection well. Alternating current voltages present at the probes, resulting from the alternating current in the electrolytic solution, are processed to provide digital signals. The digital signals are applied to a digital computer which determines the fluid velocity at a point r of the reservoir in accordance with the following vector equations:

and $$\vec{V}_{rx} = 5.614 \frac{QC}{i\phi S_v S_h} \left(\frac{\overrightarrow{\Delta V_x}}{\Delta X}\right)_m \quad 1$$

$$\vec{V}_{ry} = 5.614 \frac{QC}{i\phi S_v S_h} \left(\frac{\overrightarrow{\Delta V_y}}{\Delta y}\right)_m \quad 2$$

where $V_{rx}$ and $V_{ry}$ are the $X$ and $Y$ components, respectively, of the velocity of flow in the reservoir at a point $r$, $Q$ is the rate of a forcing fluid entering the reservoir, $i$ is the total current in the electrolytic solution, $\Phi$ is the effective porosity of the medium containing the reservoirs, $S_v$ and $S_h$ are the vertical and horizontal scale factors, respectively, of the reservoir to the model and $$\left(\frac{\overrightarrow{\Delta V_x}}{X}\right)_m, \left(\frac{\overrightarrow{\Delta V_y}}{y}\right)_m$$

are voltage gradients in the $X$ and $Y$ directions, respectively, at a point in the model corresponding to the point $r$ in the reservoir. the velocities are used to compute the interface positions of the petroleum or gas and the fluid in the reservoir by determining each incremental change in distance $\Delta s$ for a point, commonly referred to as a trace point of the interface between the fluid and the petroleum or gas, in accordance with the following equation:

$$\Delta S = (\Delta T)(\text{Vel}) \quad 3.$$

where Vel is the velocity of the trace point as determined from the computed velocities for nearby points of the reservoir and $\Delta T$ is an incremental change in time.

11 Claims, 3 Drawing Figures

United States Patent
Clauset, Jr. et al.
[15] 3,684,872
[45] Aug. 15, 1972
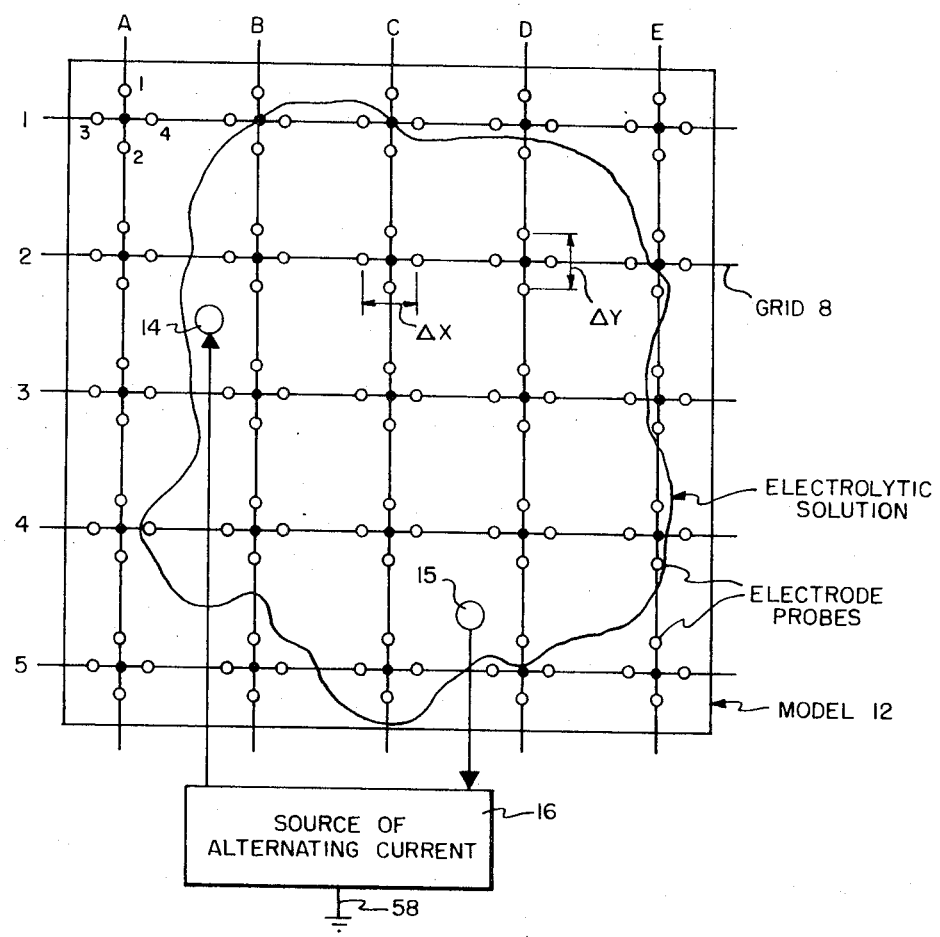
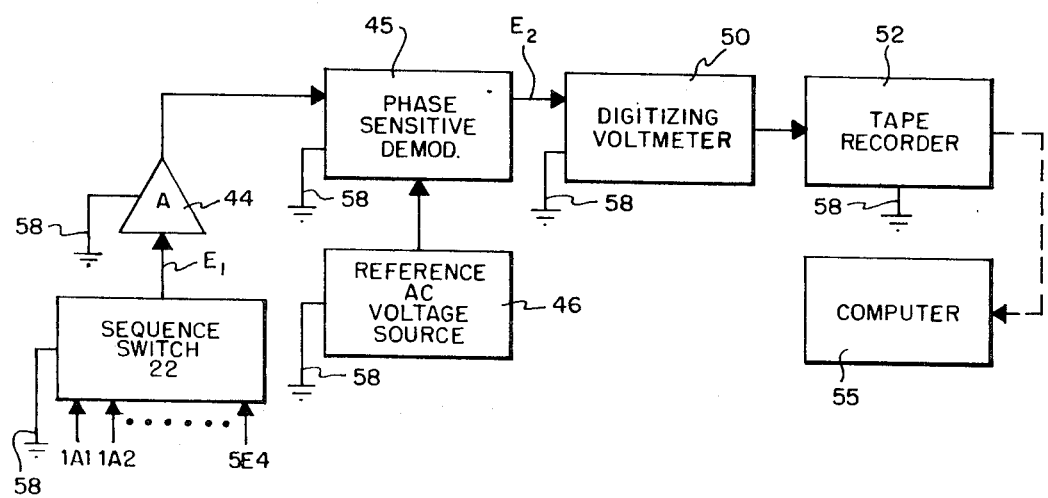

MEANS AND METHOD FOR AUTOMATICALLY DETERMINING THE INTERFACE POSITIONS OF AN INJECTION FLUID IN A PETROLEUM OR GAS RESERVOIR USING AN ELECTROLYTIC MODEL OF THE RESERVOIR

BACKGROUND OF THE INVENTION

1. Field of the Invention

The present invention relates to the determination of the flow characteristics and interface conditions of a petroleum or gas reservoir using an electrolytic model.

2. Description of the Prior Art

Heretofore, the determination of the flow characteristics and the interface positions of the petroleum or gas in a petroleum or gas reservoir and a forcing fluid which is being injected into the reservoir involved an electrolytic model of the reservoir and apparatus such as disclosed in U.S. Pat. No. 2,569,817 issued Oct. 2, 1951 to Alexander Wolf and Burton D. Lee. The disclosed apparatus uses a rotable head with two electrode probes immersed in the electrolytic solution and electrically connected to a galvanometer. The rotatable head is mechanically connected to another rotatable head having two markers. The first rotatable head is manually rotated until the galvanometer indicates that both probes are at an equipotential. The markers are then activated to provide two marks. This procedure is repeated until an equipotential line can be drawn. Since there are many equipotential lines and since the flow lines also have to be drawn in a similar manner, the method is time consuming and tedious.

Another method of determining the interface positions of a reservoir, heretofore, uses computer programs. The computer is programmed to solve simultaneous differential equations by an iterative process. Since there may be as many as several hundred differential equations, a substantial amount of time is required to reach a final determination.

The present invention differs from the foregoing methods by effectively marrying a digital computer to an electrolytic model of the reservoir so as to provide an almost instantaneous determination of the interface positions of the reservoir. In doing so, human error is substantially reduced as well as the valuable operating time of a computer.

SUMMARY OF THE INVENTION

A system is disclosed for determining a condition of a reservoir using an electrolytic solution in a model of the reservoir in which an electric current has been introduced to simulate flow within the reservoir. A plurality of electrode probes are arranged in a predetermined pattern in the electrolytic solution. The electric current in the electrolytic solution results in voltages being present at the probes. Voltages from the probes are applied to means which determine the condition of the reservoir in accordance with the voltages from the probes.

Another aspect of the invention lies in a method for determining a condition of a reservoir using an electrolytic solution as a model of the reservoir in which an electric current is introduced in the model to simulate flow in the reservoir. Electrode probes are arranged in a predetermined pattern in the electrolytic solution. Voltages from the probes are then passed. Finally, the condition of the reservoir is determined in accordance with the passed voltages.

One object of the present invention is to automatically determine the flow characteristics and interface positions of petroleum or gas in a reservoir and a forcing fluid entering the reservoir using an electrolytic model of the reservoir.

Another object of the present invention is to use a plurality of electrode probes arranged in a predetermined pattern for conducting voltages from an electrolytic model of a reservoir resulting from an alternating current being introduced in the electrolytic model.

Another object of the present invention is to provide a rapid analysis of a condition of a reservoir using an electrolytic model while minimizing human influence on the analysis.

Another object of the invention is to convert the voltages occurring at different points in an electrolytic model of a reservoir to digital signals on tape corresponding to the voltages occurring at different points in an electrolytic model of a reservoir.

The foregoing and other objects and advantages of the invention will appear more fully hereinafter from a consideration of the detailed description which follows, taken together with the accompanying drawings wherein one embodiment of the invention is illustrated by way of example. It is to be especially understood, however, that the drawings are for illustration purposes only and are not to be construed as defining the limits of the invention.

DESCRIPTION OF THE INVENTION

Figure 1:
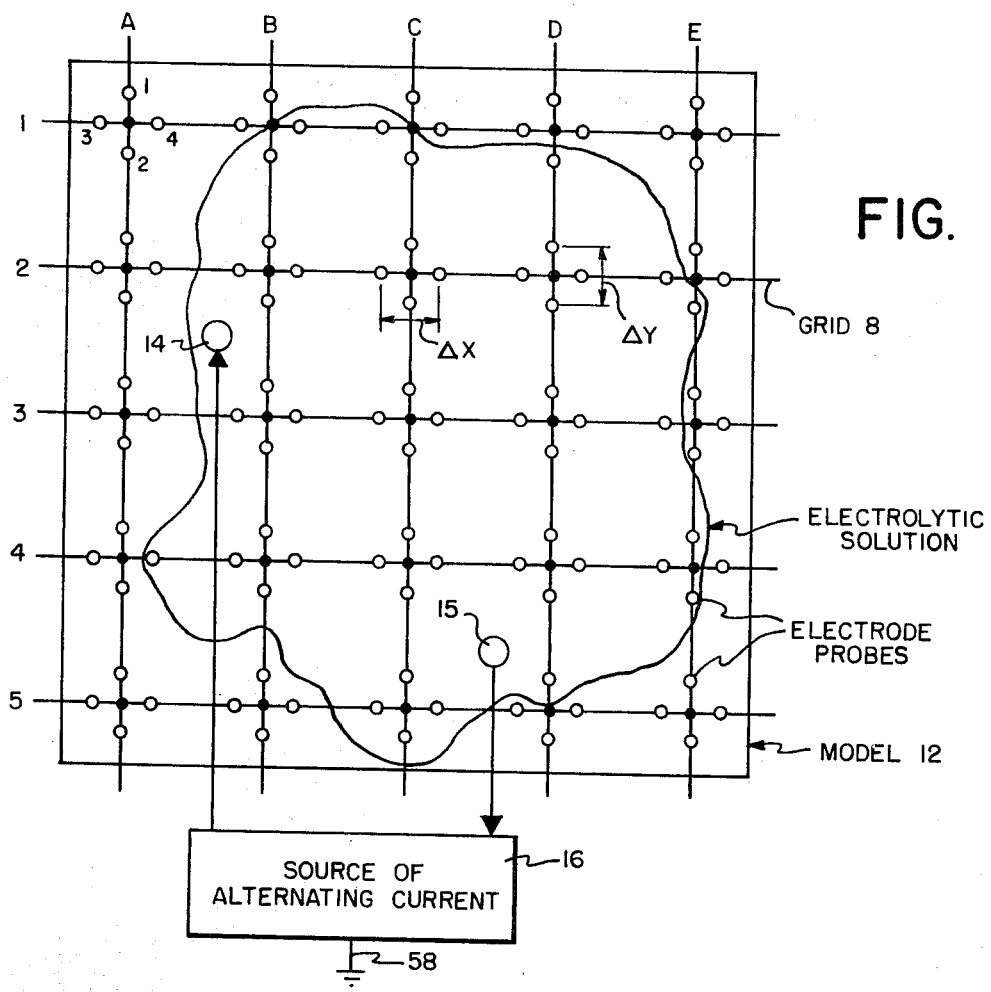
FIGS. 1 and 2 show a system, constructed in accordance with the present invention, for determining the flow characteristics and interface position of petroleum or gas in a reservoir and a forcing fluid entering the reservoir from an electrolytic model of the reservoir.

Equation 1 was derived as follows. Darcy's equation of flow, resulting from a forcing fluid being injected into a petroleum or gas reservoir, in the $X$ direction at a point $r$ in the reservoir may be written as $$\vec{V}_{rx} = \frac{k}{u}\left(\frac{\overrightarrow{dP}}{dX}\right)_r \qquad 4$$

where $V_{rx}$ is the Darcy velocity of flow in the $X$ direction at point $r$, $k$ is the permeability of a porous medium containing the petroleum or gas in darcies, $u$ is the viscosity of the petroleum or gas and $$\left(\frac{\overrightarrow{dP}}{dX}\right)_r$$

is the pressure gradient at point $r$ in the $X$ direction.

However, the true velocity must consider the effective porosity $\Phi$ of the medium containing the petroleum or gas. The effective porosity $\Phi$ is:

$\Phi =$ (Actual field porosity) $\times$ (petroleum or gas saturation)     5.

The actual field porosity is determined from the reservoir as is the petroleum or gas saturation. In considering the effective porosity $\Phi$, equation 5 may be rewritten as:

$$\vec{V}_{rx} = 2834.6 \left\{ \frac{K}{u\phi} \left( \frac{d\vec{P}}{dX} \right)_r \right\} \qquad 6.$$

The constant 2834.6 results from conforming the units of the different variables where $\vec{V}_{rx}$ is in feet per day, $k$ is in darcies, $u$ is in centipoises, $dP$ is in atmospheres, and $dx$ is in centimeters.

In the electrical analogy, voltage may be substituted for pressure so that the pressure gradient $$\left( \frac{d\vec{P}}{dx} \right)_r$$

may be re written as:

$$\left( \frac{d\vec{P}}{dx} \right)_r = a \left( \frac{d\vec{V}}{dx} \right)_m = a \left( \frac{\Delta \vec{V}x}{\Delta x} \right)_m \qquad 7.$$

which is the voltage gradient in volts per centimeter at point $m$ in the model corresponding to point $r$ in the reservoir.

The constant of proportionality $a$ in equation 7 must consider the scale factors of the rate $Q$ of the forcing liquid entering the reservoir to the alternating current $i$ in the model, the viscosity to permeability ratio $u/k$, the resistivity $\rho$ of the electrolytic solution, and the vertical and horizontal dimensions of the model $1/(S_h S_v)$. Thus, the constant of proportionality $a$ may be written as:

$$a = 0.00,199 \, (Quc)/(iKS_h S_v) \qquad 8.$$

where $c$ is the conductivity of the electrolytic solution and is the reciprocal of the resistivity $\rho$ of the electrolytic solution. The constant 0.00,199 results from the conforming of the units where $a$ is in atmosphere per centimeter/volt per centimeter, $Q$ is in barrels per day, $i$ is in amps, $c$ is in mhos per centimeter, $S_v$ and $S_h$ are in feet per centimeter.

Substituting equation 8 for $a$ in equation 7, and substituting equation 7 for $$\frac{d\vec{P}}{dX}$$

in equation 6, equation 6 may be rewritten as:

$$\vec{V}_{rx} = 5.614 \frac{Qc}{i\phi S_h S_v} \left( \frac{\Delta \vec{V}x}{\Delta X} \right)_m \qquad (9)$$

which is equation 1. Equation 2 may be developed in a similar manner.

Figure 2:
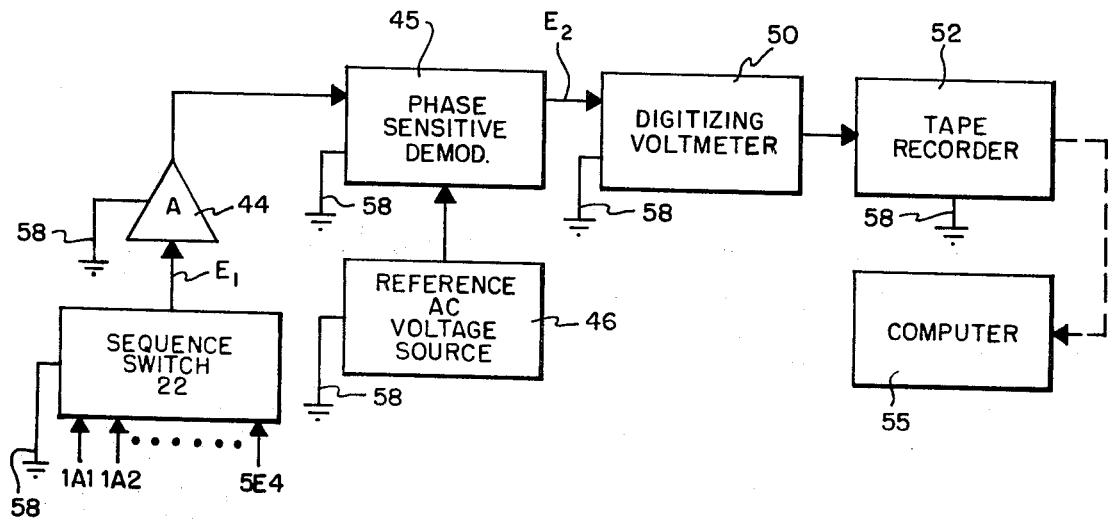

Referring to FIGS. 1 and 2, there is shown a preferred embodiment of the invention in which a grid 8 has four electrode probes straddling each intersection, two of the probes are $\Delta x$ distance apart, while the other two probes are $\Delta y$ distance apart. Each probe is hereinafter identified by the number of the row of grid 8 that the probe is affixed to, the letter of the column of the grid and the number of the probe within the group of four probes. For example, the extreme upper-left probe in FIG. 1 is identified as probe 1A3. Grid 8 overlays a model 12 of a petroleum or gas reservoir whose velocity distribution and interface positions of the petroleum or gas and a forcing liquid which is entering the reservoir are to be determined. Model 12 contains an electrolytic solution such as copper sulfate and the probes covering the surface area of the electrolytic solution are immersed in the electrolytic solution. Electrodes 14, 15 simulate a well injecting a fluid into the reservoir and a well withdrawing oil or gas from the reservoir, respectively. A source 16 provides a regulated alternating current to electrodes 14, 15, corresponding to the rate of all forcing fluid entering the reservoir.

Figure 3:
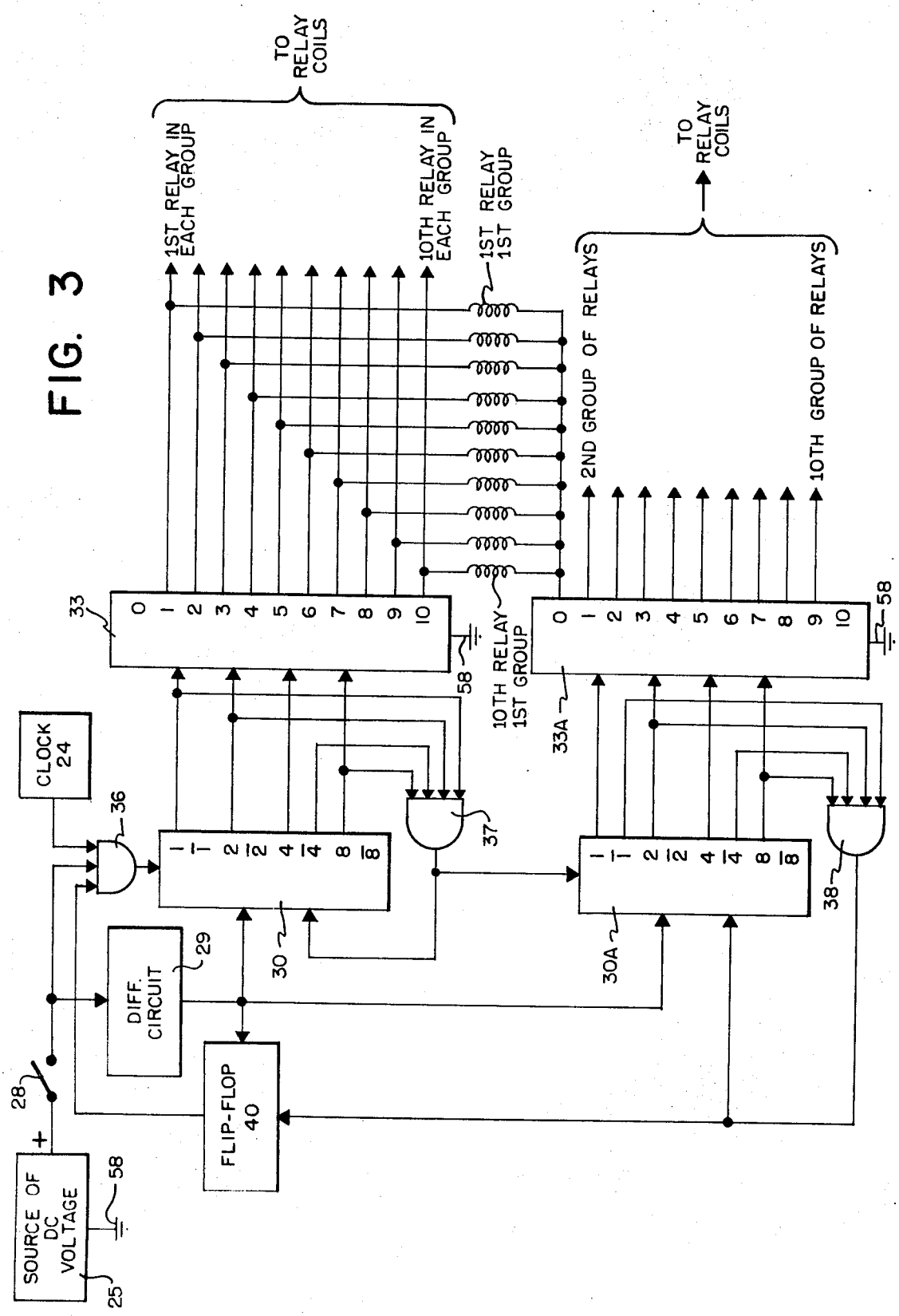
FIG. 3 is a detail block diagram of the sequence switch shown in FIG. 2.

A sequence switch, shown in detail in FIG. 3, connected to probes 1A1 through 5E4 of grid 8, passes the voltage present at each probe in a predetermined sequence as a signal $E_1$.

Referring to FIG. 3, sequence switch 22 includes 100 single pole, single throw relays which are divided into 10 groups of 10 relays. One contact of each relay is connected to a common connection, while the other contact is connected to a different probe. When energized, each relay passes the voltage present at the probe to the common connection. The energizing of the relays is controlled by a clock 24, a source 25 of a positive direct current voltage, an off-on switch 28, a differentiating circuit 29, counters 30 and 30A, binary coded decimal-to-decimal converters 33 and 33A, AND gates 36, 37 and 38, and a flip-flop 40. The switching sequence is started by closing switch 28 to pass the direct current voltage from source 25 to differentiating circuit 29 and to AND gate 36. The leading edge of the passed direct current voltage is differentiated by differentiating circuit 29 to provide a reset pulse $E_2$ which resets counters 30, 30A and flip-flop 40. When flip-flop 40 is reset, flip-flop 40 provides a direct current voltage to AND gate 36, which along with the direct current voltage from switch 28 enables AND gate 36 so that it passes the timing pulses to counter 30. Counters 30, 30A, and AND gates 37, 38 form a two-stage counter. Counter 30A in effect responds to every eleventh pulse from AND gate 36 and is reset by the one hundred tenth pulse while counter 30 is reset by every eleventh pulse.

When the one hundred tenth pulse is effectively counted by counter 30A, AND gate 38 provides an output to flip-flop 40 and to counter 30A, causing flip-flop 40 to change state, thereby disabling AND gate 36 while resetting counter 30A. The disabled AND gate 36 blocks the timing pulses from clock 24 to end the sequence switching.

Each output of converter 33 is connected to one end of corresponding relay coils in each group of relays, while each output of converter 33A is connected to the other end of the relay coils in a group of relays. For ease of explanation, only the first group of relays coils are shown in FIG. 3. For the first ten pulses, converter 33A effectively connects the end of the coils in the first group to ground. In response to a count of one by counter 30, converter 33 applies a voltage to the coils of the first relay in each group. However, only the coil of the first relay in the first group is connected to ground so that it alone is energized. The following table relates the count of counters 30, 30A to the probe whose voltage is being passed by sequence switch 22.

| Count | Probe | Count | Probe | Count | Probe | Count | Probe | Count | Probe |
|---|---|---|---|---|---|---|---|---|---|
| 1 | 1A1 | 23 | 1B1 | 45 | 1C1 | 67 | 1D1 | 89 | 1E1 |
| 2 | 1A2 | 24 | 1B2 | 46 | 1C2 | 68 | 1D2 | 90 | 1E2 |
| 3 | 1A3 | 25 | 1B3 | 47 | 1C3 | 69 | 1D3 | 91 | 1E3 |
| 4 | 1A4 | 26 | 1B4 | 48 | 1C4 | 70 | 1D4 | 92 | 1E4 |
| 5 | 2A1 | 27 | 2B1 | 49 | 2C1 | 71 | 2D1 | 93 | 2E1 |
| 6 | 2A2 | 28 | 2B2 | 50 | 2C2 | 72 | 2D2 | 94 | 2E2 |
| 7 | 2A3 | 29 | 2B3 | 51 | 2C3 | 73 | 2D3 | 95 | 2E3 |
| 8 | 2A4 | 30 | 2B4 | 52 | 2C4 | 74 | 2D4 | 96 | 2E4 |
| 9 | 3A1 | 31 | 3B1 | 53 | 3C1 | 75 | 3D1 | 97 | 3E1 |
| 10 | 3A2 | 32 | 3B2 | 54 | 3C2 | 76 | 3D2 | 98 | 3E2 |
| 11 | | 33 | | 55 | | 77 | | 99 | |
| 12 | 3A3 | 34 | 3B3 | 56 | 3C3 | 78 | 3D3 | 100 | 3E3 |
| 13 | 3A4 | 35 | 3B4 | 57 | 3C4 | 79 | 3D4 | 101 | 3E4 |
| 14 | 4A1 | 36 | 4B1 | 58 | 4C1 | 80 | 4D1 | 102 | 4E1 |
| 15 | 4A2 | 37 | 4B2 | 59 | 4C2 | 81 | 4D2 | 103 | 4E2 |
| 16 | 4A3 | 38 | 4B3 | 60 | 4C3 | 82 | 4D3 | 104 | 4E3 |
| 17 | 4A4 | 39 | 4B4 | 61 | 4C4 | 83 | 4D4 | 105 | 4E4 |
| 18 | 5A1 | 40 | 5B1 | 62 | 5C1 | 84 | 5D1 | 106 | 5E1 |
| 19 | 5A2 | 41 | 5B2 | 63 | 5C2 | 85 | 5D2 | 107 | 5E2 |
| 20 | 5A3 | 42 | 5B3 | 64 | 5C3 | 86 | 5D3 | 108 | 5E3 |
| 21 | 5A4 | 43 | 5B4 | 65 | 5C4 | 87 | 5D4 | 109 | 5E4 |
| 22 | | 44 | | 66 | | 88 | | 110 | |

Referring to FIG. 2, signal $E_1$ from switch 22 is amplified by a fixed gain amplifier 44 and applied to a conventional type phase sensitive demodulator 45. Demodulator 45 demodulates the amplified signal in accordance with a reference alternating current voltage from a source 46 to provide a direct current voltage $E_2$ to a digitizing voltmeter 50. The direct current voltage has an amplitude and a polarity corresponding to the amplitude and the phase, respectively, of the amplified signal from switch 22. Voltmeter 50, which may be a Fluke Digital Voltmeter model 8300A, provides a direct reading and a digital signal corresponding to the voltage difference between the direct current voltages. If a direct reading is not desired, then voltmeter 50 may be replaced by a conventional type analog-to-digital converter. The digital signal is recorded on a magnetic tape by a tape recorder 52 which may be of the type manufactured by Cipher Data Products, model 70-556.

The magnetic tape is used as a memory for a computer 55 which is programmed to determine the voltage gradient and solves either equation 1 or equation 2, depending on what voltages are being passed by switch 22. Computer 55 may be of the type manufactured by the Control Data Corporation as model 3500 or by International Business Machine Corporation as Model 360/65. Computer 55 uses the velocities computed in accordance with equations 1 and 2 to compute the velocity of a trace point so that the movement of the trace point may be determined in accordance with equation 3. The arrangement of several trace points is indicative of the position in the reservoir of the interface between the forcing fluid and the petroleum or gas.

Alternating current source 16, amplifier 44, phase sensitive demodulator 45, reference voltage source 46, voltmeter 50 and tape recorder 52 are connected to a ground 58 to provide a common reference potential for the voltages from the probes of grid 8.

The spacing of the lines of grid 8 is not critical since the distance between the probes about an intersection is constant. It is possible to place a probe at each intersection instead of the four probes, as heretofore described. Under the latter arrangement voltages from probes at adjacent intersections would then be used to determine the voltage gradient at an intersection. However, when using the latter arrangement, the distance between lines of the grid does substantially affect the accuracy of the computations.

The device of the present invention as heretofore described uses electrode probes arranged in a predetermined pattern to conduct voltages from an electrolytic model of a reservoir of petroleum or gas. The voltages are converted to digital signals and stored on tapes. A computer uses the tape in determining the voltage gradients at various points in the model which are then used in the computation of the flow characteristics and interface positions of the reservoir.

What is claimed is:

1. A system for determining a condition of a reservoir using an electrolytic model of the reservoir, comprising means for introducing an electrical current in the electrolytic model to simulate the movement of a fluid into the reservoir, a plurality of electrode probes arranged in a predetermined stationary pattern in the electrolytic model, switching means connected to the probes for passing voltages from the electrode probes, and means connected to the switching means for determining the condition in accordance with the passed voltages from the switching means.

2. A system as described in claim 1, in which the electrode probes are mounted on an insulated grid in such a manner so that voltage gradients can be determined for each point in the electrolytic model corresponding to a different intersection of the grid; the determining means includes means connected to the electrode probes for determining the voltage gradients at each point; and means connected to the voltage gradient determining means for determining the condition in accordance with the voltage gradients; and the electrical current means includes at least two electrodes, one electrode corresponding to an injection well in the reservoir, the other electrode corresponding to a withdrawal well, and means for providing the electrical current.

3. A system as described in claim 2, in which the condition to be determined is the position of the interface of the fluid with the content of the reservoir, as defined by trace points, and is computed in accordance with the following equations:

$$\Delta S = \Delta T(\text{Vel}),$$

$$\vec{V}_{rx} = 5.64 \frac{Qc}{i\phi S_v S_h} \left(\frac{\overrightarrow{\Delta V_x}}{\Delta X}\right)_m$$

and $$\vec{V}_{ry} = 5.64 \frac{Qc}{i\phi S_v S_h} \left(\frac{\overrightarrow{\Delta V_y}}{\Delta y}\right)_m$$

where $\Delta T$ is an increment of time, $\Delta S$ is an incremental distance corresponding to the movement of a trace point from a previous position during the time $\Delta T$, $V_{rx}, V_{ry}$ are the $x, y$ velocity components, respectively, at a point $r$ in the reservoir, Vel is the resultant velocity of the trace point, $Q$ is the movement rate of the fluid into the reservoir in barrels per day, $i$ is the total current in the electrolytic model in amps, $\Phi$ is the effective porosity of the medium containing the content of the reservoir, $S_v$ and $S_h$ are the vertical and horizontal scale factors, respectively, of the reservoir to the model, $$\left(\frac{\overrightarrow{\Delta V x}}{\Delta x}\right)_m \text{ and } \left(\frac{\overrightarrow{\Delta V y}}{\Delta y}\right)_m$$

are voltage gradients at an intersection $m$ of the grid corresponding to the point $v$ in the reservoir.

4. A system as described in claim 3, in which the switching means include a plurality of groups of relays connected to the determining means, each relay being also connected to a different probe for passing the voltage present at the probe to the determining means when energized and for blocking the voltage when deenergized, means for providing timing pulses, means connected to the timing pulse means for counting the timing pulses, means connected to the counting means and to the relays for providing a voltage to corresponding relays in each group of relays in accordance with the count in the counting means, and means connected to the counting means and to the relays for grounding a group of relays in accordance with the count in the counting means so that only a relay that simultaneously receives a voltage from the voltage means and is grounded by the last mentioned means is energized.

5. A system as described in claim 3, in which the electrical current introduced in the electrolytic model is an alternating current, and the determining means connected to the voltage gradient determining means include amplifying means connected to the switching means and to the fixed electrical reference and amplifying the passed voltages, a phase sensitive demodulator connected to the amplifying means and to the electrical reference and controlled by a reference voltage for converting the passed voltages to direct current voltages having amplitudes and polarities corresponding to the amplitudes and phases, respectively, of the passed alternating current voltages, and an analog-to-digital converter connected to the phase sensitive demodulator and to the fixed electrical reference and providing digital signals corresponding to the direct current voltages from the phase sensitive demodulator.

6. A system as described in claim 5, in which the determining means includ a tape recorder connected to the analog-to-digital converter and to the fixed electrical reference and providing a taped record of the digital signals from the analog-to-digital converter, and a digital computer which computes the condition using the signals stored on the tape.

7. A method for determining a condition of a reservoir using an electrolytic model, which comprises introducing an electrical current in the electrolytic model to simulate the injection of a fluid into the reservoir, arranging a plurality of electrode probes in a predetermined stationary pattern in the electrolytic model, controlling switching means to pass voltages present at the electrode probes and determining the condition in accordance with the passed voltages.

8. A method as described in claim 7, in which the arranging step includes mounting the electrode probes on an insulated grid in such a manner so that voltage gradients can be determined for each point in the electrolytic model corresponding to a different intersection of the grid and the determining step includes determining the voltage gradients at the points in the electrolytic model, and determining the condition in accordance with the voltage gradients.

9. A method as described in claim 8 in which the electrical current is an alternating current, the passed voltages are alternating current voltages, and which further comprises controlling the switching means to pass one voltage at a time from the electrode probes in a predetermined sequence, and the determining step includes amplifying the passed alternating current voltages, demodulating the amplified current voltages to provide direct current voltages having amplitudes and polarities corresponding to the amplitudes and the phases, respectively, of the amplified alternating current voltages, and converting the direct current voltages to digital signals.

10. A method as described in claim 9 in which the determining step includes subtracting a voltage from an electrode of a pair of electrode probes, from a voltage from the other electrode probe of the pair of electrode probes, and dividing the voltage different by the predetermined distance between the electrode probes of the pair of electrode probes to determine a voltage gradient at the intersection of the grid associated with the pair of electrode probes.

11. A method as described in claim 10 in which the condition to be determined is the interface position of the fluid with the content of the reservoir, as defined by trace points, and the determining step includes computing the interface position in accordance with the following equations:

$$\Delta S = (\Delta T)(\text{Vel})$$

$$\vec{V}_{rx} = 5.64 \frac{Qc}{i\phi S_v S_h} \left(\frac{\overrightarrow{\Delta V x}}{\Delta x}\right)_m$$

and $$\vec{V}_{ry} = 5.64 \frac{Qc}{i\phi S_v S_h} \left(\frac{\Delta V y}{\Delta y}\right)_m$$

where $\Delta T$ is an incremental change in time, $\Delta S$ is an incremental distance corresponding to the movement of a trace point from a previous position during the time $\Delta T$, $V_{rx}$, $V_{ry}$ are the $x$ and $y$ velocity components, respectively, at point $r$ in the reservoir, Vel is the resultant velocity of the trace point, $Q$ is the movement rate of the fluid into the reservoir in barrels per day, $i$ is the total current in the electrolytic solution in amps, $\Phi$ is the effective porosity of the medium containing the petroleum or gas, $Sv$ and $S_h$ are the vertical and horizontal scale factors, respectively, of the reservoir to the model, $$\left(\frac{\overrightarrow{\Delta V x}}{\Delta x}\right)_m \text{ and } \left(\frac{\overrightarrow{\Delta V x}}{\Delta y}\right)_m$$

are voltage gradients at an intersection $m$ of the grid corresponding to the point $r$ in the reservoir.

* * * * *